United States Patent
Park

(10) Patent No.: US 6,891,305 B2
(45) Date of Patent: May 10, 2005

(54) LAMINATION SHEET AND CORE LAMINATION STRUCTURE OF A MOTOR

(75) Inventor: Kyeong Bae Park, Gwangmyoung (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/060,205

(22) Filed: Feb. 1, 2002

(65) Prior Publication Data

US 2002/0105245 A1 Aug. 8, 2002

(30) Foreign Application Priority Data

Feb. 2, 2001 (KR) ..................................... 10-2001-5120
Jan. 15, 2002 (KR) ..................................... 10-2002-2320

(51) Int. Cl.[7] .............................. H02K 1/06; H02K 1/12
(52) U.S. Cl. ..................................................... 310/217
(58) Field of Search .............................. 310/216–217; 29/596–598, 605, 606

(56) References Cited

U.S. PATENT DOCUMENTS

| | | | |
|---|---|---|---|
| 5,142,178 A | * | 8/1992 | Kloster et al. ............... 310/217 |
| 5,799,387 A | | 9/1998 | Neuenschwander et al. |
| 5,923,112 A | * | 7/1999 | Bertocchi et al. ........... 310/217 |
| 5,945,748 A | | 8/1999 | Park et al. |
| 6,060,810 A | | 5/2000 | Lee et al. |
| 6,573,624 B2 | | 6/2003 | Park |
| 6,628,018 B2 | | 9/2003 | Song et al. |
| 6,646,535 B2 | | 11/2003 | Miyake et al. |
| 6,700,286 B2 | | 3/2004 | Park |

FOREIGN PATENT DOCUMENTS

| | | |
|---|---|---|
| CN | 1158511 A | 9/1997 |
| JP | 10-323009 A | 4/1998 |
| JP | 10-322945 A | 12/1998 |
| JP | 11-113195 A | 4/1999 |

OTHER PUBLICATIONS

Tom Neuenschwander; "Motor Design & Manufacturing—Technology provides new flexibility to core design", www.ammagazine.com, posted Aug. 30, 2003.
"Metal Caulking [No. 1] System ENA–lock", www.enami.co.jp/eng/p . . . , Mar. 13, 2004.
"[Example of Making Cases By Caulking (Weldless Process)]", www.enami.co.jp/kr/pr . . . , Mar. 13, 2004.
"Motor Technology—Lamination Die Technology", www.appliancemagazine.com, issued Jul. 2003 in Appliance Magazine.

* cited by examiner

*Primary Examiner*—Tran Nguyen
(74) *Attorney, Agent, or Firm*—Birch, Stewart, Kolasch & Birch, LLP

(57) ABSTRACT

A core lamination structure in a motor is constructed such that a plurality of lamination sheets of a predetermined shape are laminated to form a laminated body, that is, a unit lamination core. The unit lamination core formed by the plurality of lamination sheets is fixedly coupled by a caulking portion or a coupling portion formed on the respective lamination sheet and connected with the adjacent lamination sheets to be in a row. In this way, a fabricating process of the unit lamination core is made to be easy and simple to reduce time for fabricating, and a curvature for a curved surface portion of the unit lamination core can be changed so that the present invention can be applied to various motors according to the capacity or the size of the motor.

1 Claim, 8 Drawing Sheets

LAMINATION SHEET AND CORE LAMINATION STRUCTURE OF A MOTOR

BACKGROUND OF THE INVENTION

1. Field of the Invention

The present invention relates to a method for core lamination in a motor and lamination structure thereof, and particularly, to a core laminating method and the lamination structure in the motor by which a curvature of a laminated body which is made by laminating a plurality of lamination sheets and coupled to a bobbin can be changed, and a structure and a fabrication can be made simply.

2. Description of the Background Art

Generally, a reciprocating motor is made by changing a magnetic flux of a general motor having a steric structure to be a plane shape, that is, a movable portion of plane shape is linearly moved on a plane according to changes of magnetic flux formed on a fixed portion on the plane.

FIGS. 1 and 2 are showing an example of the reciprocating motor, and as shown therein, the reciprocating motor comprises: a stator S including an outer core 10 and an inner core 20 formed as a cylinder so as to be inserted into the outer core 10; a winding coil 30 coupled inside of the outer core 10 or inside the inner core 20; an armature 40 inserted between the outer core 10 and the inner core 20 so as to be moved. And the winding coil 30 is inserted into the outer core 10 in the Figures.

Hereinafter, the movement of the reciprocating motor will be described as follows.

When power is applied and current is flowed on the winding coil 30, the flux is formed around the winding coil 30 by the current flowing on the winding coil 30. In addition, the flux forms a closed loop along with the stator, that is, the outer core 10 and the inner core 20.

In addition, according to an interaction between the flux on the outer core 10 and the inner core 20 and the flux formed by a permanent magnet, the permanent magnet 41 is pressed to an axial direction, and therefore, the armature 40 is reciprocally moved in the axial direction between the outer core 10 and the inner core 20. And if the direction of the current flowing on the winding coil 30 is changed, the armature 40 is reciprocally moved and the force of the reciprocating movement becomes a driving force for another system when the force of the reciprocating movement is coupled to the another system.

On the other hand, the outer core 10 included in the stator S is made such that a plurality of unit lamination cores 11 having a predetermined thickness by laminating a plurality of lamination sheets L formed as a predetermined shape are coupled to a bobbin 50 of ring shape, in which the coil 30 is wound, in a radial direction with a predetermined gap therebetween.

In addition, inner circumferential surfaces of the plurality of unit lamination cores 11 coupled to the bobbin 50 in radial direction form a circle having a predetermined curvature so as to correspond to outer circumferential surface of the bobbin 50, and an outer side surface of the lamination cores 11 forms a curved surface corresponding to the curvature of the inner circumferential surface.

Also, a cross-section of the unit lamination cores 11 is formed as "⊏" shape, and includes a path portion (a) forming a path of the flux, and a pole portions (b) of triangular shapes formed on both ends of the path portion (a). In addition, the bobbin 50 is located in an opened recess (H) formed by the pole portions (b) and the path portion (a), and the winding coil 30 which is made by laminating coil to be a plurality of layers is coupled to the bobbin 50.

That is, the lamination sheet L constructing the unit lamination cores 11 is formed by a thin plate including the path portion (a) formed as "⊏" shape and the pole portions (b) of triangular shape formed on both ends of the path portion (a).

In addition, as shown in FIG. 3, the unit lamination core 11 is fabricated such that the lamination sheet L is cut from the thin plate and the lamination sheets are laminated to be a predetermined thickness, and curved surfaces are formed using a jig so that both side surfaces of the laminated body form the curved surfaces. In addition, the laminated body including the curved surfaces is welded in a thickness direction of the laminated body, that is, in a vertical direction, then the lamination core is fabricated.

However, according to the conventional art, the laminated body of the lamination sheets L is fixed and coupled by welding, and therefore the fabrication process is complex and the it costs much time to fabricate, whereby the productivity is lowered.

Also, the unit lamination core 11 is fabricated by fixing and coupling the laminated body of the lamination sheets L using welding method, and therefore, the curvature of the unit lamination core can not be easily changed when the outer circumferential surface curvature is changed due to the design.

SUMMARY OF THE INVENTION

Therefore, an object of the present invention is to provide a method for core lamination in a motor and a lamination structure thereof by which a curvature of a laminated body in which a plurality of lamination sheets are laminated can be changed, and its fabrication can be made simply.

To achieve the object of the present invention, as embodied and broadly described herein, there is provided a method for core lamination for a motor comprising: a step of fabricating a lamination sheet of a predetermined shape on which a coupling means is formed; a step of fixedly laminating a plurality of lamination sheets as a predetermined thickness which are connected so that the coupling means formed on one side surface of the lamination sheets are in a row; and a step of forming curved surface portions on both side surfaces of a laminated body in which the plurality of lamination sheets are laminated and fixed so as to be a predetermined thickness.

To achieve the object of the present invention, there is also provided a lamination structure of cores in a motor in which a laminated body is formed by laminating a plurality of lamination sheets having a predetermined shape to have a predetermined thickness, and the respective lamination sheets are fixedly coupled by the coupling means which are formed on the lamination sheets so as to be connected with adjacent lamination sheets in a row and then so as to be moved.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a first embodiment of the motor core laminating method and the lamination structure thereof according to the present invention will be described as follows.

Figure 1:
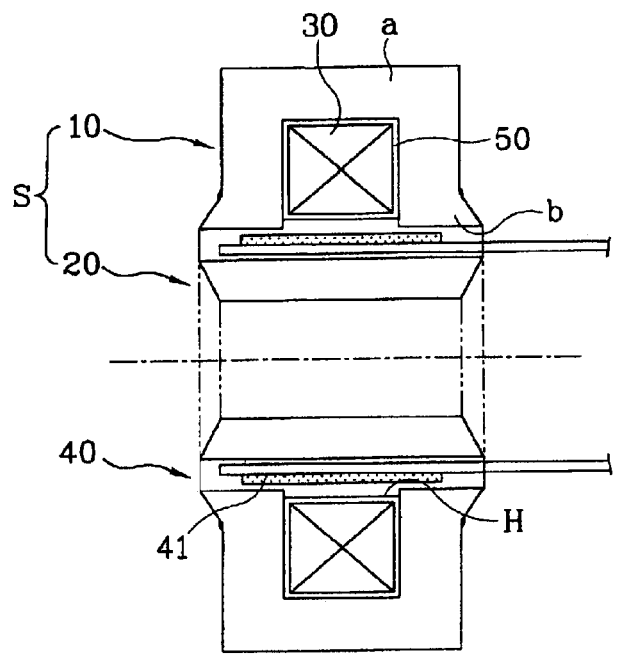
FIG. 1 is a front cross-sectional view showing a conventional reciprocating motor.
Figure 2:
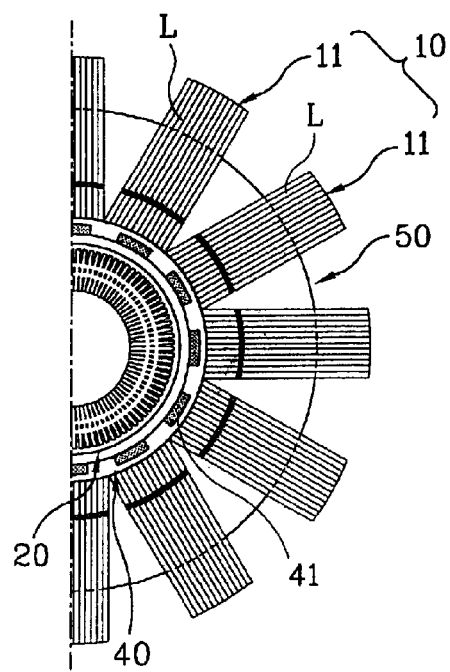
FIG. 2 is a side view showing the conventional reciprocating motor.
Figure 3:
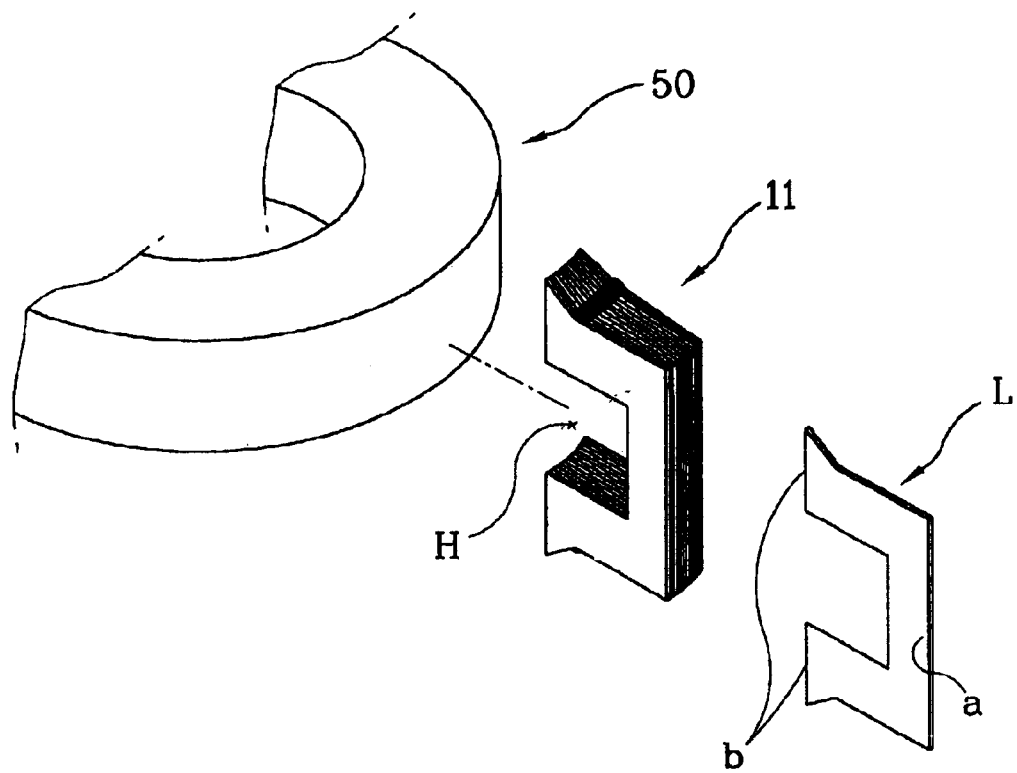
FIG. 3 is a perspective view showing assembling process of an outer core included in the reciprocating motor shown in FIGS. 1 and 2.
Figure 4:
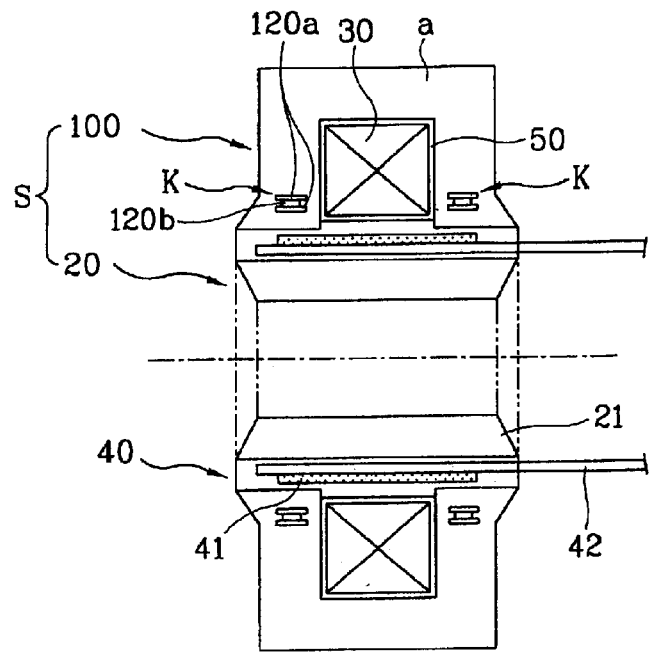
FIG. 4 is a front cross-sectional view showing a reciprocating motor including a first embodiment of motor core lamination structure according to the present invention.
Figure 5:
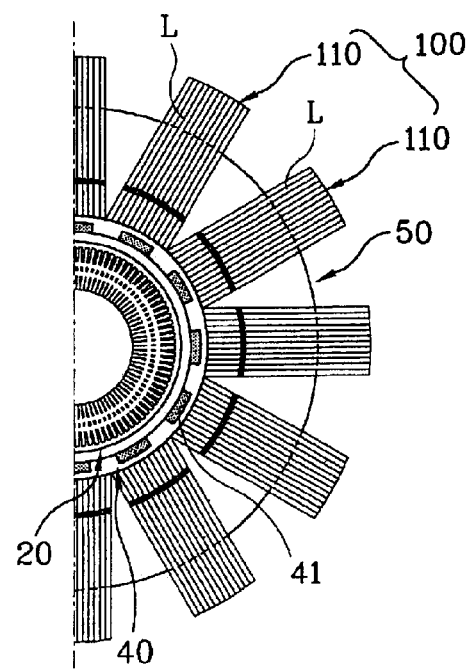
FIG. 5 is a side view showing the reciprocating motor including the first embodiment of motor core lamination structure according to the present invention.

FIGS. 4 and 5 are showing an embodiment of a motor including the motor core lamination structure according to the present invention. As shown therein, the motor comprises: a stator (S) including an outer core 100 and an inner core 20 formed as a cylinder so as to be inserted into the outer core 100; a winding coil 30 coupled to inside of the outer core 100 or the inner core 20; and an armature 40 including a permanent magnet and inserted between the outer core 100 and the inner core 20 so as to be moved. The winding coil 30 is coupled into the outer core 100 in the accompanying figure.

In addition, the outer core 100 included the stator S is formed such that a plurality of unit lamination cores 110, in which a plurality of lamination are laminated to be a predetermined thickness, are coupled to the bobbin 50 of ring shape, in which the coil 30 is wound, with a predetermined intervals therebetween in radial direction.

In addition, inner circumferential surfaces of the plurality of unit lamination cores 110 coupled to the bobbin 50 in the radial direction form a circle having a predetermined curvature so as to be corresponded to an outer circumferential surface of the bobbin 50, and outer side surfaces of the unit lamination cores 110 form a curved surface corresponding to the curvature of the inner circumferential surface.

Figure 6:
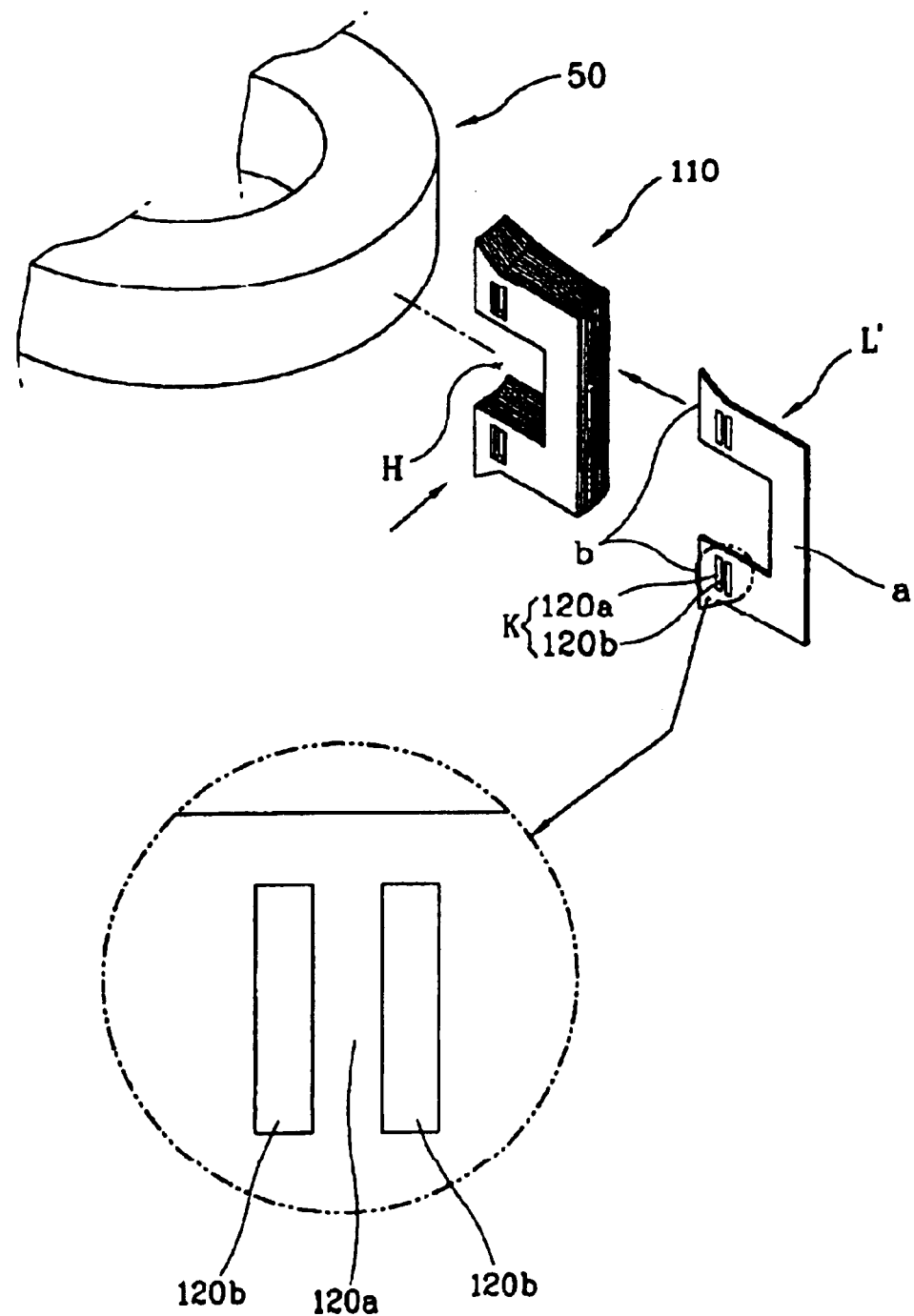
FIG. 6 is a perspective view showing an assembling process for an outer core included in the first embodiment of the motor core lamination structure according to the present invention.

On the other hand, as shown in FIG. 6, a plurality of lamination sheets L' formed as a thin plate of predetermined shape are laminated so as to have a predetermined thickness to form the unit lamination core 110.

In addition, a plurality of caulking portions K for fixedly connecting with the adjacent lamination sheets L' in a row are formed on one side surface of the respective lamination sheet L' constructing the unit lamination core 110, and therefore the respective lamination sheets L' constructing the unit lamination core 110 are fixedly coupled by the caulking portion K.

That is, the lamination sheet L' constructing the unit lamination core 110 comprises a path portion (a) formed as "⊏" shape, a pole portion (b) formed on both ends of the path portion (a) as triangular shape, and the caulking portions (K) formed on one side surface of the path portion (a) or of the pole portion (b).

In addition, the bobbin 50 is located on an opened recess H formed by the inner space of the path portion (a) and the pole portion (b) when the lamination sheets L' are laminated.

Also, the caulking portion K formed on one side surface of the lamination sheet L' comprises two moving space holes 120b as penetrated, and a bending coupling portion 120a which is located between the moving space holes 120b and will be bent later.

In addition, the length direction of the caulking portion K is formed to be same as that of the path portion (a).

And, the inner core 20 includes a laminated body in which lamination sheets 21 of predetermined shape are laminated in radial direction so as to form a cylinder.

In addition, the armature 40 includes a plurality of permanent magnets 41, and the permanent magnet 41 is installed on a permanent magnet holder 42 of cylindrical form and inserted between the outer core 100 and the inner core 20, that is, the stator S with a predetermined air gap therebetween.

Figure 7:
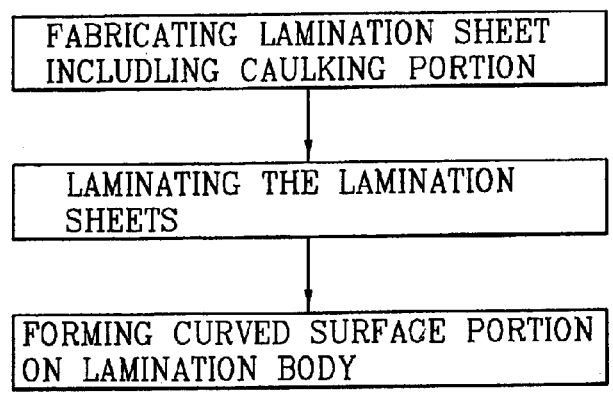
FIG. 7 is a flow chart showing a motor core laminating method according to the present invention.

On the other hand, as shown in FIG. 7, a first step of the motor core lamination method according to the present invention is to fabricate a lamination sheet L' of predetermined shape including the caulking portion K using a thin plate.

Then, a plurality of lamination sheets L' are caulked sequentially and laminated to be a predetermined thickness so that the caulking portions K of the lamination sheets L' are in a row, and the unit lamination core 110 is fabricated.

In addition, a curved surface is formed on the side surface of the unit lamination core 110 using a jig. And a plurality of unit lamination cores 110 fabricated as above are coupled to the bobbin 50 in radial direction.

Figure 9:
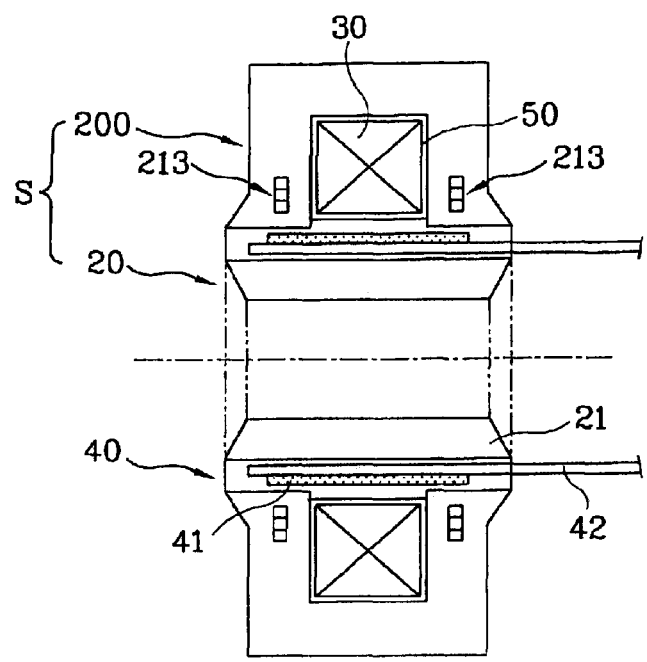
FIG. 9 is a front cross-sectional view showing a reciprocating motor including a second embodiment of the motor core lamination structure according to the present invention.
Figure 10:
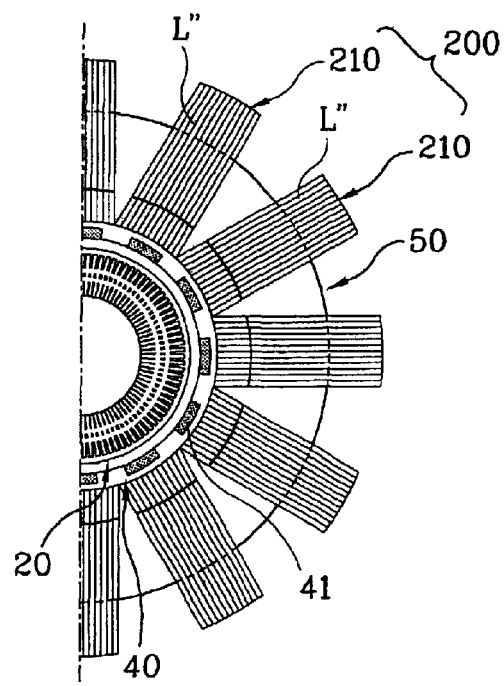
FIG. 10 is a side view showing the reciprocating motor including the second embodiment of the motor core lamination structure according to the present invention.

FIGS. 9 and 10 are showing an embodiment of a motor including a second embodiment of the motor core lamination structure according to the present invention. As shown therein, the motor comprises a stator S including an outer core 200 and an inner core 20 formed as a cylinder so as to be inserted into the outer core 200, a winding coil 30 coupled to inside of the outer core 200, and an armature 40 including a permanent magnet 41 and inserted between the outer core 200 and the inner core 20 so as to be moved.

In addition, the outer core 200 constructing the stator S comprises a plurality of unit lamination cores 210, in which a plurality of lamination sheets L" formed by thin plates of predetermined shape are laminated so as to have a predetermined thickness, coupling portions 213, which are protruded so as to be engaged with each other and therefore the lamination sheets L" can be moved relatively, are formed on the respective lamination sheets L" constructing the unit lamination core 210. Therefore, the respective coupling portions 213 of the lamination sheets L" are engaged with each other when the caulking process is made, and thereby the unit lamination cores 210 are fixedly coupled with each other.

The plurality of unit lamination cores 210 are coupled to the bobbin 50 formed as a ring in radial direction. The inner circumferential surface of the plurality of unit lamination cores 210 coupled to the bobbin 50 in radial direction forms a circular shape, and the unit lamination cores 210 are located with a predetermined intervals on the outer side. At that time, the inner side surface and the outer side surface of the unit lamination core 210 contacting to the outer circumferential surface of the bobbin 50 are coupled so that a curved surface having a curvature corresponding to the curvature of the outer circumferential surface of the bobbin 50 can be made by the respective coupling portions 213 of the lamination sheets L" constructing the unit lamination core 210.

Figure 11:
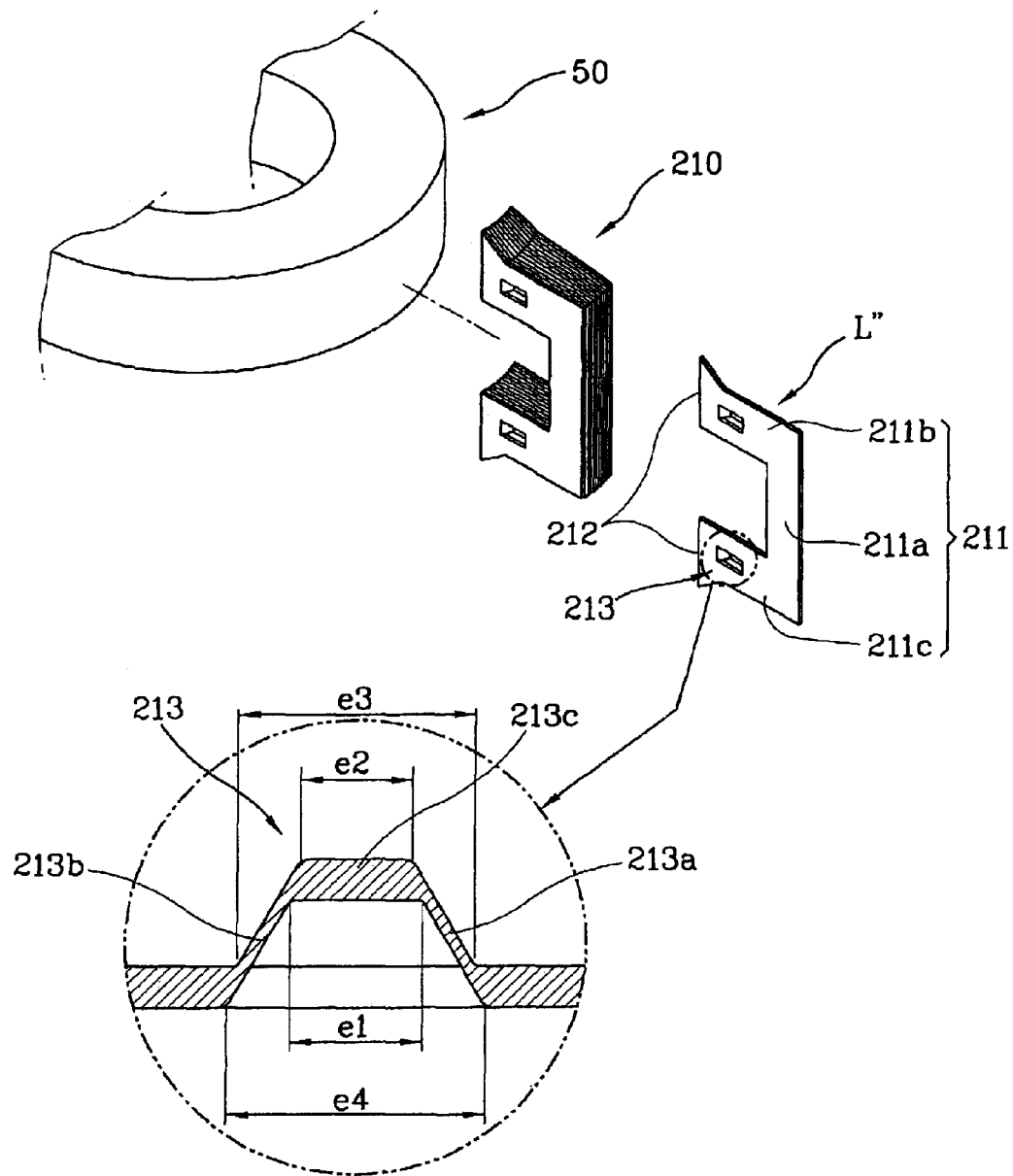
FIG. 11 is a perspective view showing an assembling process of an outer core included in the second embodiment of the motor core lamination structure according to the present invention.

As shown in FIG. 11, the unit lamination core 210 comprises a path portion 211, in which a lengthwise plate 211a having a predetermined width and length and a first and a second transverse plate 211b and 211c bent from both ends of the lengthwise plate 211a so that the lamination sheet L" constructing the unit lamination core 210 is formed as "⊏" shape and a part of the bobbin 50 in which the coil is wound is located inside the lengthwise plate 211a and the first and second transverse plates 211b and 211c, a pole portion 212 formed on both ends of the first and second transverse plates 211b and 211c in the path portion 211 to form poles, and a coupling portion 213 protruded on one side of the first and second transverse plates 211b and 211c in the path portion 211 so as to have a predetermined width and length by pressing.

The coupling portion 213 formed on the path portion 211 includes a first and a second slant plates 213a and 213b bent to be slant for the plate of the path plate 211 so as to have a predetermined length, and a connecting flat plate 213c for connecting both ends of the first and second slant plates 213a and 213b.

In addition, the first and second slant plates 213a and 213b and the connecting flat plate 213c are formed to be protruded to one side so that the cross-sections of them form trapezoid shape, and a length (e1) of the inner side surface of the connecting flat plate 213c is formed longer than a length (e2) of the outer side surface of the connecting flat plate 213c.

In addition, a length direction of the coupling portion 213 is same as that of the first and second transverse plates 211b and 211c of the path portion 211. That is, the first slant plate 213a, the connecting flat plate 213c, and the second slant plate 213b of the coupling portion 213 are formed successively in the length direction of the first and second transverse plates 211b and 211c, and the protruded width (e3) of the protruded part in the coupling portion 213 is smaller than the concave width (e4) of the concave part.

The inner core 20 is a laminated body in which the lamination sheets 21 of a predetermined shape are laminated in radial direction so as to form a cylinder.

The armature 40 comprises a plurality of permanent magnet 41 bits, and the permanent magnet 41 bits are installed on a permanent magnet holder 42 of cylindrical form and inserted between the stator, that is, the inner core 20 and the outer core 200 including a plurality of unit lamination cores 210.

On the other hand, a plurality of lamination sheets L" of thin plate having a predetermined area including coupling portions 213 are fabricated, and the plurality of lamination sheets L" are laminated to be a predetermined thickness in order to fabricate the unit lamination core 210.

At that time, the coupling portions 213 included on the respective lamination sheets L" are engaged by being connected with each other in a row when the caulking process is performed.

In addition, the unit lamination core 210 is adhered to a jig having a curvature corresponding to the bobbin 50 or to the outer circumference of the bobbin 50, and therefore a curved surface portion R is formed so that the surface contacting to the outer circumferential surface of the bobbin 50 and the other side surface form curved surfaces.

At that time, the coupling portions 213 of the lamination sheets which are adjacent to each other among the plurality of lamination sheets L" are pushed little by little and moved, and thereby the curved surface portion R of the unit lamination core 210 is formed.

Figure 12:
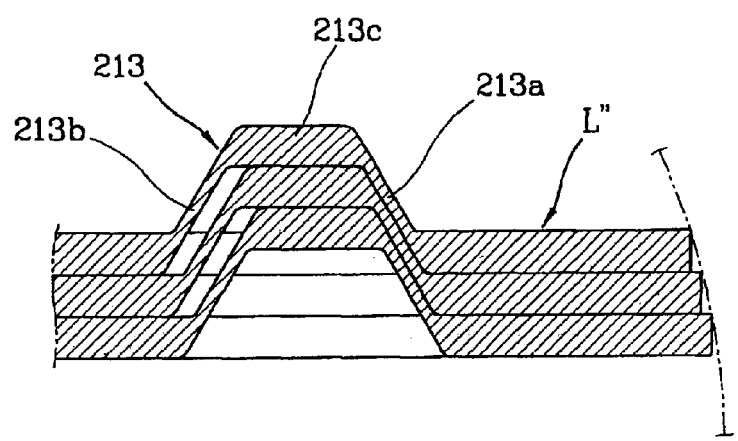
FIG. 12 is a partial side cross-sectional view showing a coupled state of a coupling portion which is applied by the second embodiment of the motor core lamination structure according to the present invention.
Figure 13:
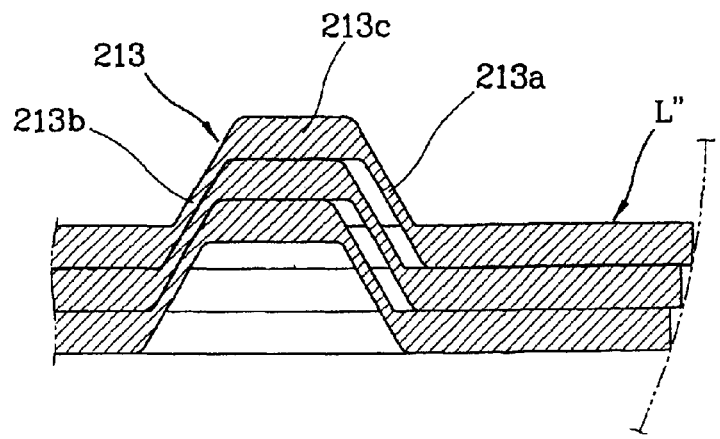
FIG. 13 is a partial side cross-sectional view showing a coupled state of a coupling portions which is applied by the second embodiment of the motor core lamination structure according to the present invention.

That is, as shown in FIG. 12, the lamination sheets L" located on one side centering around the coupling portion of the lamination sheet L" located on center part of the unit lamination core 210 are pushed and moved to the first slant plate 213a of the above coupling portions 213. In addition, as shown in FIG. 13, the lamination sheets L" located on the other side of the central lamination sheet L" are pushed and moved toward the second slant plate 213b of the above coupling portion 213. Therefore, the curved surface portion R having a curvature corresponding to the curvature of the outer circumferential surface of the bobbin 50 is made. And a plurality of unit lamination cores 210 fabricated as above are coupled to the outer circumferential surface of the bobbin 50 in radial direction.

In addition, in case that the unit lamination cores 210 are coupled to a bobbin 50 having larger outer diameter, the motion of the coupling portions 213 of the lamination sheets constructing the unit lamination core 210 is reduced to increase the curvature of the curved surface portion R, and thereby the coupling corresponding to the curvature of the outer circumferential surface of the bobbin 50.

Hereinafter, operation and effect of the motor core lamination structure according to the present invention will be described as follows.

The outer core 100 and 200 and the inner core 20 made by the core lamination structure construct the stator S, and the armature is inserted between the outer core 100, 200 and the inner core 20 of the stator S. In addition, when current is applied to the winding coil 30 coupled to inside of the outer core 100, 200, the flux formed by the current flows along with the stator S, and the armature 40 is linearly moved by an interaction between the flux flowing on the stator S and the permanent magnets 41 included in the armature 40.

In addition, when the direction of the electric current applying on the winding coil 30 is switched, the armature 40 linearly moves.

Figure 8:
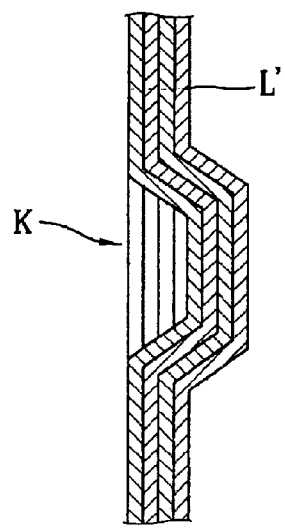
FIG. 8 is a partial side cross-sectional view showing a caulking portion being applied the first embodiment of the motor core lamination structure according to the present invention.

As shown in FIG. 8, a plurality of lamination sheets L' including the caulking portion K are laminated so that the caulking portions are connected in a row, and thereby the lamination sheets L' are fixedly coupled and the unit lamination core 110 is made.

Therefore, in forming the curved surface portion R on both side surfaces of the unit lamination core 110, the bending coupling portions 120b of the caulking lamination core 110 are caulked, after that, the lamination sheets are moved by the moving space hole 120a of the caulking portion K on the adjacent lamination sheet, and thereby the curved surface portion R can be formed on both side surfaces of the unit lamination core 110.

Also, the laminated body constructing the unit lamination core 110 is fixedly coupled successively by the caulking process using the caulking portion K formed on the respective lamination sheet L', and thereby, the fabrication of the unit lamination core 110 and coupling the unit lamination core 110 to the bobbin can be performed simply.

Also, according to the present invention, a plurality of lamination sheets L" are fixedly coupled by engaging with each other after caulking the coupling portions 213 formed on the lamination sheets so as to be moved, and therefore the lamination process of the lamination sheets L" can be made simply.

In addition, a movement to the side direction can be made by the engaging structure, and the curved surface portion R of discretionary size can be formed on the both side surfaces of the unit lamination core 210.

Also, the coupling portions 213 of the plurality of lamination sheets L" constructing the unit lamination core 210 are formed as protruded by being pressed, and thereby, fabrication of the coupling portions can be made simply. In addition, the shape of the coupling portion 213 is formed as a simple trapezoid shape, therefore, the structure of the coupling portions is to be simple.

As described above, according to motor core laminating method and the lamination structure of the present invention, the curvature of the laminated body in which a plurality of lamination sheets are laminated, that is, the unit lamination core can be changed, and thereby the present invention can be applied to the motors of various capacity and size. Therefore, the unit lamination core of one-type can be applied a plurality of motor models to increase the degree of utilization, and the assembling process can be made simply, and thereby the time and cost spent on the fabrication can be reduced to increase the productivity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A core lamination structure of a motor in which a laminated body is formed by laminating a plurality of lamination sheets of thin plate, and the respective lamination sheets are fixedly coupled together by coupling means which are formed on the respective lamination sheets constructing the laminated body so as to be connected together in a row with adjacent lamination sheets, wherein the coupling means is a caulking portion comprising two moving space holes formed on one side of the respective lamination sheets to allow adjacent lamination sheets to move with respect to one another, and a bending coupling portion located between the two moving space holes which will be bent when a caulking process is performed.

* * * * *